Figure 1:
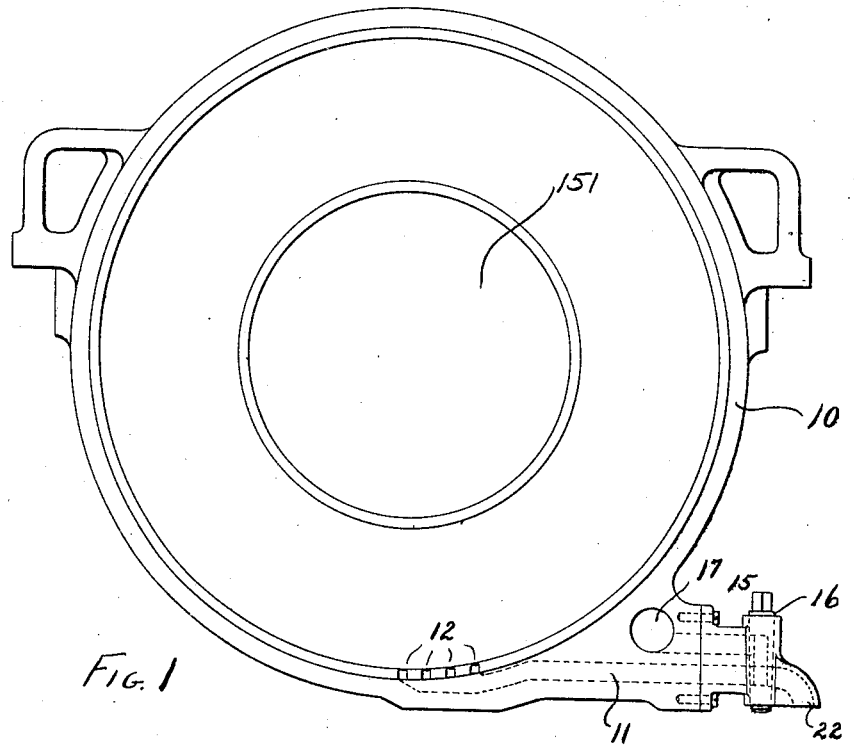

E. F. ATKINS.
FILTER.
APPLICATION FILED JUNE 23, 1919.

1,342,839.

Patented June 8, 1920.
2 SHEETS—SHEET 1.

INVENTOR.
EARL F. ATKINS
BY
Gifford & Bull
ATTORNEYS

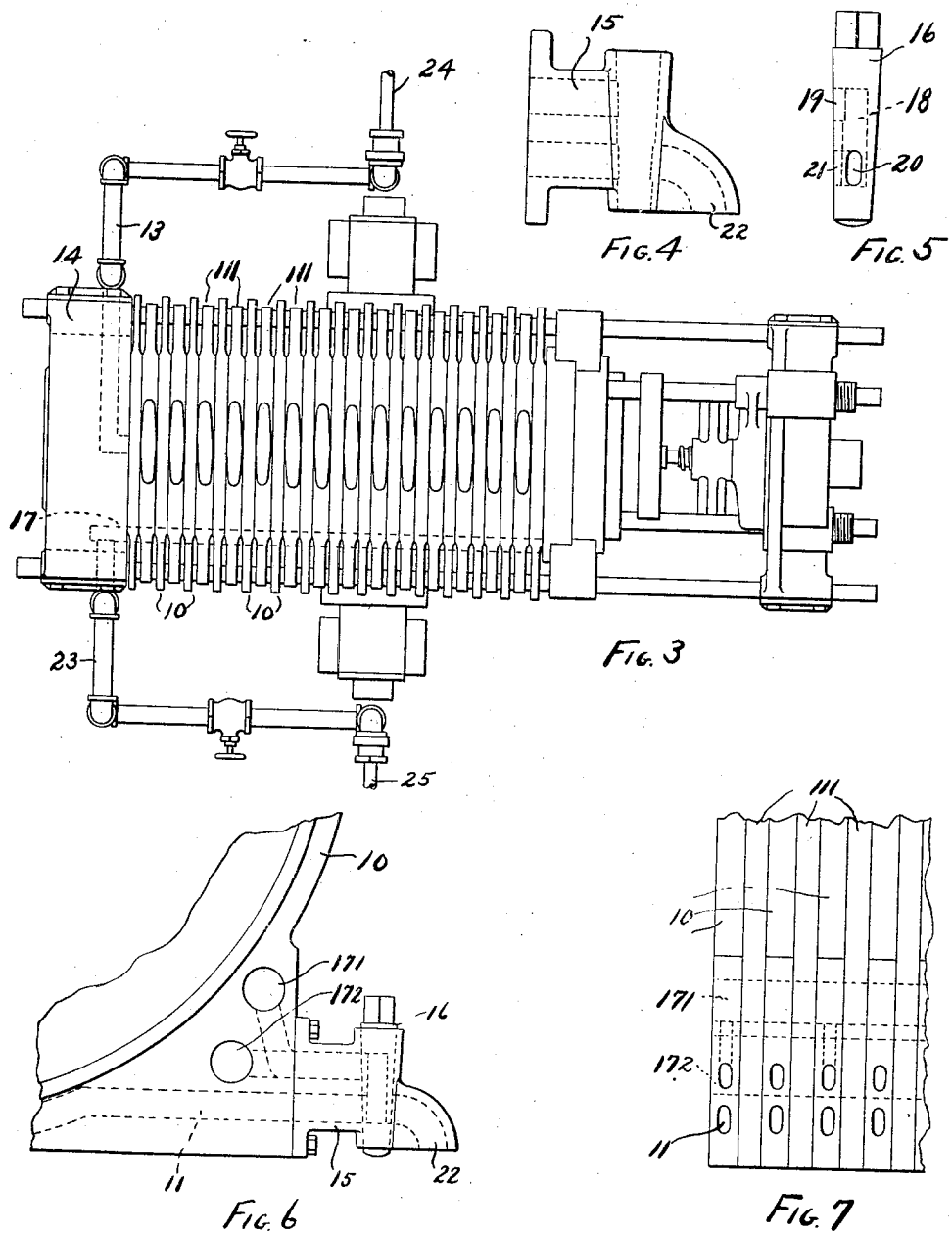

UNITED STATES PATENT OFFICE.

EARL FRANK ATKINS, OF ARLINGTON, NEW JERSEY, ASSIGNOR TO HARRY T. SHRIVER, OF WEST ORANGE, NEW JERSEY.

FILTER.

1,342,839. Specification of Letters Patent. Patented June 8, 1920.

Application filed June 23, 1919. Serial No. 306,037.

*To all whom it may concern:*

Be it known that I, EARL F. ATKINS, a citizen of the United States, residing at Arlington, in the county of Hudson and State of New Jersey, have invented certain new and useful Improvements in Filters, of which the following is a specification.

My present invention relates to devices for filtering fluids in which the solids filtered therefrom are built up on the filtering surfaces. One of the objects of my invention is to provide a simple and efficient means by which if any one of the filtering surfaces should fail, that surface can be disconnected without affecting the operation of the remaining surfaces.

Another object of the invention is to provide a filter which will enable the washing of the cake to be carried out in an efficient manner and according to any one of a number of methods as the operator may elect.

With these and other objects in view, my invention consists of certain novel features of construction, combination and arrangement of parts as will be more fully described and pointed out in the appended claims.

In the drawings I have shown my improvement as applied to a filter press of the type disclosed in the patent to F. K. and E. F. Atkins, No. 1,273,127, granted July 23, 1918, and reference may be had to the drawings of that patent for a more detailed disclosure of the specific filter which I have chosen for purposes of illustration.

Figure 2:
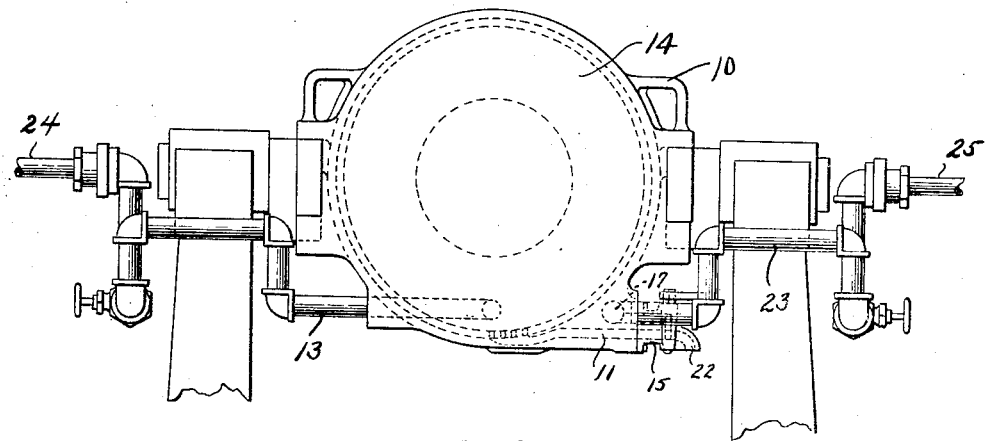

In the drawings, Figure 1 is an end elevation of a filter plate of the type used in presses of the kind illustrated in said patent having one form of my present invention incorporated therein; Fig. 2 is an end elevation of a portion of a filter press of the type illustrated in said patent modified to illustrate my present invention; Fig. 3 is a plan of the filter press illustrated in Fig. 2; Figs. 4 and 5 are detailed views of the specific valve which I have used for illustrative purposes, and Figs. 6 and 7 are fragmentary side and end elevations of a portion of a filter press with a modification of my present invention incorporated therein.

The corresponding parts are referred to both in the drawings and in the specification by similar reference characters.

In the specific form of filter press which I have chosen for purpose of illustration, there is a series of plates and frames between the faces of which filter cloth is laid, the whole being held firmly together by screw clamps. This is the well-known form of "plate and frame" filter presses. In the specific form illustrated these plates and frames, as so held, are mounted on trunnions so that the whole arrangement may be either horizontal or vertical. My present invention is applicable to any form of filter press, particularly of the plate and frame kind, and it will be unnecessary for me to describe the specific arrangement for holding or mounting the plates and frames.

In the drawings, 10 are the plates which are all exactly alike and 111 the frames placed between them. The filter cloths are not shown but it will be understood that such cloths are spread over the face of the plate so that the fluid to be filtered enters each frame, and by reason of the pressure applied to this fluid, the clear liquid passes through the cloth against the surface of the plate from which it runs into suitable openings at the bottom and thence to an outlet, the solid material in the fluid remaining on the face of the cloth in the frame. The outlet for the plate 10 is located at the bottom, as shown at 11 in Fig. 1, this outlet being cast in the plate and extending to openings 12 which communicate with the surface of the plate behind the filter cloth. The material to be filtered is supplied through the pipe 13 which extends through the fixed head 14 and communicates with the successive frames through the opening 151 which, in the type of filter press illustrated, extends through the several plates. If the filter were of the usual type without the central opening 151, it would be necessary to have a conduit extending along the press and communicating directly with the several frames, all as in the usual manner.

On each of the plates 10 and communicating with the outlet 11 thereof I provide a multiple-way valve 15 having a plug 16, this multiple-way valve also communicating with a conduit 17 which, in the preferred form, is made by a passage-way extending through each plate and frame so that when the plates and frames are pressed together a continuous conduit will be formed. It will be understood that for some purposes this conduit may be outside of and independent of the plates and frames.

The multiple-way valve, as shown best in Figs. 4 and 5, has its plug formed with a vertical opening 18 and a horizontal opening 19 communicating therewith, and below and on the level of the outlet 11 a pair of oppositely disposed openings 20 and a single opening 21. The plug 16 may be rotated by a suitable handle and it will be seen that it may be set so that a fluid passing from the outlet 11 may pass directly through the openings 20 through the spout 22 to the exterior of the plate.

By turning the plug 16 through 90° from its first position, fluid coming through the outlet 11 will pass into the opening 18 and thence out through the port 19 into the conduit 17.

Again by turning the plug 16 through 180° from the position shown in Fig. 5, the outlet 11 will be closed entirely.

In my preferred form, I provide a pipe 23 communicating with one end of the conduit 17. In the specific form illustrated the pipes 13 and 23 are so arranged as to communicate through a tight swivel joint with pipes 24 and 25 so that the press may be turned on its axis. It will be understood, however, that any other form of piping by which the fluids may be led into and away from the filter press, may be used in accordance with the kind of press to which my invention is applied.

It will be noted that, in distinction to the press illustrated in said Patent 1,273,127, there is only one "eye" or portion of a conduit in each plate. The advantage of this arrangement will be indicated hereinafter.

In operation, the fluid to be filtered is supplied in the usual manner through the pipe 13 and the cake of solids gradually built up on each filter cloth in each frame. If the filtrate is merely waste fluid which may be disposed of in any fashion, then all of the plugs 16 may be set so that the fluid will pass from each plate directly through the spouts 22. If on the other hand, the filtrate is of such a character as to make it undesirable to expose it to the air, then all of the plugs 16 will be turned to the position shown in Fig. 5 so that the filtrate will flow from each plate into the conduit 17 and from thence through the pipe 23 to the desired point of delivery.

After the cake has been built up it is often desirable to wash it, and the multiple valve which I have provided, together with the single conduit, provide a ready means to this end.

If, for instance, it is desired to wash the cake by passing the wash water to the reverse side of the cloths of every other plate and from thence through the cake and cloths to the next plate, alternate plugs 16 will be set in the position shown in Fig. 5 and the remaining plugs set so as to open the outlet 11 to the spout 22. Now, if wash water is passed through the pipe 23 and conduit 17, it will flow into the outlets 11 of alternate plates and from thence through the cake into the outlet 11 of the next plate from which it will pass to the exterior through the spout 22. After this washing is continued for a time, the operation may be reversed by opening the first set of valves and by closing the remainder so as to communicate with the conduit 17. It will be understood that, in washing the cake by this method in the illustrative type of press, the central opening 151 will be filled with wash water and the valve in pipe 13 closed, to prevent the cake being washed away from the cloths.

An important feature of my present invention resides in the fact that herebefore in a plate and frame press, when a filter cloth became broken or torn, this permitted some of the unfiltered solution to pass out with the filtrate from the remaining plates which were in operation. The provision of a valve to close off the outlet of such presses was insufficient to prevent this mixture of fluids if the filter, as is usual, was provided with a number of eyes such as 18 and 19 of said Patent No. 1,273,127 through which the various wash waters could be introduced. It is obvious that these eyes serve as direct lines of communication between the filtering surfaces of the successive plates. This, of course, is immaterial so long as the filter cloth is completely over each of such surfaces. If a single cloth is broken, however, the unfiltered solution will pass through one of these eyes to the next plate and from thence through the outlet for that plate. By providing the single conduit 17, it is obvious that the closing of the valve 15 for any plate will completely isolate such plate and, no matter what the condition of its cloth may be, there will be no mixture of filtered and unfiltered fluids.

In some cases it is desired that the washing fluid shall also be delivered when the washing from plate to plate, as described above, is carried out. This is not possible with the undivided conduit 17 shown in Fig. 1, but in Figs. 6 and 7 I have shown the conduit 17 divided into two branches 171 and 172 with the valves communicating alternately with one of these branches. For instance, the valves on the first and third plates from the left of Fig. 7 communicate with branch 171 and the valves on the second and fourth plates from the left of Fig. 7 communicate with branch 172. It will be understood that, by suitable piping at the ends, the two branches may be united when a filter press embodying this modification is to be used for the ordinary washing processes, but that when it is desired to wash from cake to cake with a closed delivery, then the wash water will enter one of the branches, say 172, and will pass through the multiple valve into the plate and from thence through the cake to the next plate and from thence through the outlet and the second multiple valve into the branch 171 to the closed delivery point.

It will be understood that while I have referred to wash water as the washing fluid, either steam, compressed air or any other form of fluid or gas may be used for washing and drying the cake, and that by the term wash water I include any or all of these materials.

It will also be understood that the form of valve may be varied within wide limits, and that the particular form shown is merely illustrative. While I find it convenient to use a multiple-way valve, it will be understood that a plurality of individual valves could be used in place of each multiple valve.

What I claim and desire to secure by Letters Patent of the United States is:—

1. A filter press having alternate filter plates and filter frames with filter cloths between said plates and frames, means for supplying the solution to be filtered to said filter press, each of said plates having an outlet leading to the exterior of the plate, a closed conduit extending along said plates and frames, said outlets and said conduit being normally out of communication, and a multiple way valve on each plate adapted when in the first position, to open the corresponding outlet to the exterior of the plate and to prevent communication between said outlet and said conduit, and when in the second position, to close said outlet to the exterior of the plate and to connect said outlet with said conduit, and when in the third position, to close said outlet and to prevent communication between said outlet and said conduit.

2. A filter having alternate filter plates and filter frames with filter cloths between said plates and frames, means for supplying the solution to be filtered to each of said frames, each of said plates having an outlet leading to the exterior of the plate, a closed conduit extending along said plates and frames and a multiple way valve on each plate communicating with the outlet thereof and with said conduit, said conduit and said valves constituting the sole means of communication between the active surface of any two plates, whereby the outlet from the interior of any plate may be closed off from communication with the active surface of any other plate through said conduit.

3. A filter having alternate filter plates and filter frames with filter cloths between said plates and frames, means for supplying the solution to be filtered to said press, each of said plates having an outlet, a two-branch closed conduit extending along said plates and frames, and a plurality of multiple-way valves, each valve communicating with one of said outlets and with one of the branches of said divided conduit, said valves being arranged so that alternate outlets may be made to communicate with the same branch, whereby washing fluid may be forced through one of said branches into alternate plates, through the filter cloths, and out of the outlets of the remaining plates into the other of said branches.

EARL FRANK ATKINS.